United States Patent [19]

McEachern, Jr. et al.

[11] Patent Number: 4,652,219
[45] Date of Patent: Mar. 24, 1987

[54] TURBOCHARGER HAVING A PRELOADED BEARING ASSEMBLY

[75] Inventors: J. Albert McEachern, Jr., Mobile; J. William Brogdon, Daphne, both of Ala.

[73] Assignee: Teledyne Industries, Inc., Los Angeles, Calif.

[21] Appl. No.: 894,728

[22] Filed: Aug. 8, 1986

Related U.S. Application Data

[63] Continuation of Ser. No. 739,384, May 30, 1985, abandoned.

[51] Int. Cl.$^4$ ........................ F04B 17/00; F04B 35/04
[52] U.S. Cl. ...................................... 417/407; 384/518
[58] Field of Search ........................ 417/405, 406, 407; 384/518, 519, 539, 563

[56] References Cited

U.S. PATENT DOCUMENTS

| | | | |
|---|---|---|---|
| 2,492,672 | 12/1949 | Wood | 417/407 |
| 2,703,674 | 3/1955 | Wood | 417/407 |
| 2,709,567 | 5/1955 | Wood | 417/407 |
| 2,925,215 | 2/1960 | Weatherbee | 417/407 |
| 2,973,136 | 2/1961 | Greenwald | 417/407 |
| 3,017,230 | 1/1962 | Meermans | 417/407 |
| 3,056,634 | 10/1962 | Woolenweber et al. | 417/407 |
| 3,132,594 | 5/1964 | Shiley et al. | 417/407 |
| 3,176,620 | 4/1965 | Shiley | 417/407 |
| 4,233,821 | 11/1980 | De Salve | 417/407 |
| 4,285,632 | 8/1981 | De Salve | 417/407 |

FOREIGN PATENT DOCUMENTS

| | | | |
|---|---|---|---|
| 858190 | 1/1961 | United Kingdom | 417/407 |

Primary Examiner—Louis J. Casaregola
Assistant Examiner—Timothy S. Thorpe
Attorney, Agent, or Firm—Gifford, Groh, VanOphem, Sheridan, Sprinkle and Dolgorukov

[57] ABSTRACT

A turbocharger having a main housing with a throughbore through which a tubular bearing carrier is coaxially positioned. A shaft extends through the bearing carrier and is rotatably secured to the bearing carrier by a pair of axially spaced bearing assemblies, each having an inner race, an outer race and bearing elements entrapped therebetween. A pair of spacers are coaxially positioned around the shaft in between the bearing assemblies so that an outer axial end of each spacer abuts against the outer race of each bearing assembly. A helical compression spring in a state of compression urges the spacers axially away from each other to equalize the axial compressive load on each bearing assembly and thereby minimize bearing skidding and uneven wear.

4 Claims, 2 Drawing Figures

TURBOCHARGER HAVING A PRELOADED BEARING ASSEMBLY

This a continuation of Ser. No. 739,384 filed on May 30, 1985, now abandoned.

BACKGROUND OF THE INVENTION

I. Field of the Invention

The present invention relates generally to turbochargers and, more particularly, to a turbocharger with a preloaded bearing assembly.

II. Description of the Prior Art

There are a number of previously known turbochargers having a housing in which a shaft is rotatably mounted. A turbine is attached to one end of the shaft and a compressor is attached to the opposite end of the shaft. Bearing assemblies, such as one or more ball bearing assemblies, rotatably mount the shaft to the housing.

In operation, the output from the compressor is connected to the intake of an internal combustion engine while the exhaust from the engine is connected to the inlet of the turbine. Thus, during operation of the engine, exhaust products from the engine rotatably drive the turbine which, in turn, drives the compressor which inducts fresh air, compresses the air and supplies the compressed air to the engine.

For effective operation of the turbocharger, the turbocharger shaft, and thus the turbine and the compressor, necessarily rotate at high rotational speeds. As a result, any vibration or play in the bearing assembly not only creates excessive noise but also results in rapid deterioration of the bearing assembly and its associated components.

There have, however, been a number of previously known devices which impose a load on the bearing assemblies in order to minimize any mechanical play within the bearing assemblies. These previously known devices, however, have been complicated and complex in construction and not wholly effective in operation. Furthermore, many of these previously known devices which preload the bearing assemblies impose uneven loads on the bearing assemblies which results in uneven wear.

SUMMARY OF THE PRESENT INVENTION

The present invention provides a turbocharger construction which overcomes all of the above mentioned disadvantages of the previously known devices.

In brief, the turbocharger of the present invention comprises a main housing having a throughbore and a tubular bearing carrier which is coaxially positioned through the throughbore. A shaft extends through the bearing carrier and this shaft has a turbine at one end and a compressor at its other end.

A pair of axially spaced bearing assemblies rotatably mount the shaft to the bearing carrier and each bearing assembly includes an inner race, an outer race and rotatable bearing elements entrapped between the races. The inner races of the bearing assemblies are secured against axial movement to the shaft by an inner spacer tube and two annular slingers. The slingers are secured to the shaft so that one slinger abuts against the outer axial end of each bearing assembly inner race.

A first and second annular spacer is positioned coaxially around the shaft in between the bearing assemblies. Each spacer includes an outer axial end which abuts against the inner axial end of the outer race for each bearing assembly. The inner axial end of the second spacer abuts against a radially inwardly extending flange on the bearing carrier so that the second spacer is sandwiched in between the bearing carrier flange and the outer race of its adjacent bearing assembly. A helical compression spring in a state of compression is then disposed around the shaft in between the inner axial end of the first spacer and the radially inwardly extending portion of the bearing carrier.

In operation, the helical compression spring exerts an outward force at one end to the first spacer and thus on the outer race of the first bearing assembly. This force is then transmitted to the opposite end of the helical spring through the shaft second bearing assembly second spacer and the bearing carrier flange. Consequently, the outward forces exerted by the compression spring on the outer races for both bearing assemblies are precisely equal to each other.

A primary advantage of the present invention is that the spring not only eliminates any mechanical play present in the bearing assemblies and thus vibration during operation of the turbocharger, but is also simple and efficient in construction. Furthermore, the entire means for preloading the bearing assembly is wholly contained in between the bearing assemblies thus resulting in a compact and lightweight construction.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DETAILED DESCRIPTION OF A PREFERRED EMBODIMENT OF THE PRESENT INVENTION

Figure 1:
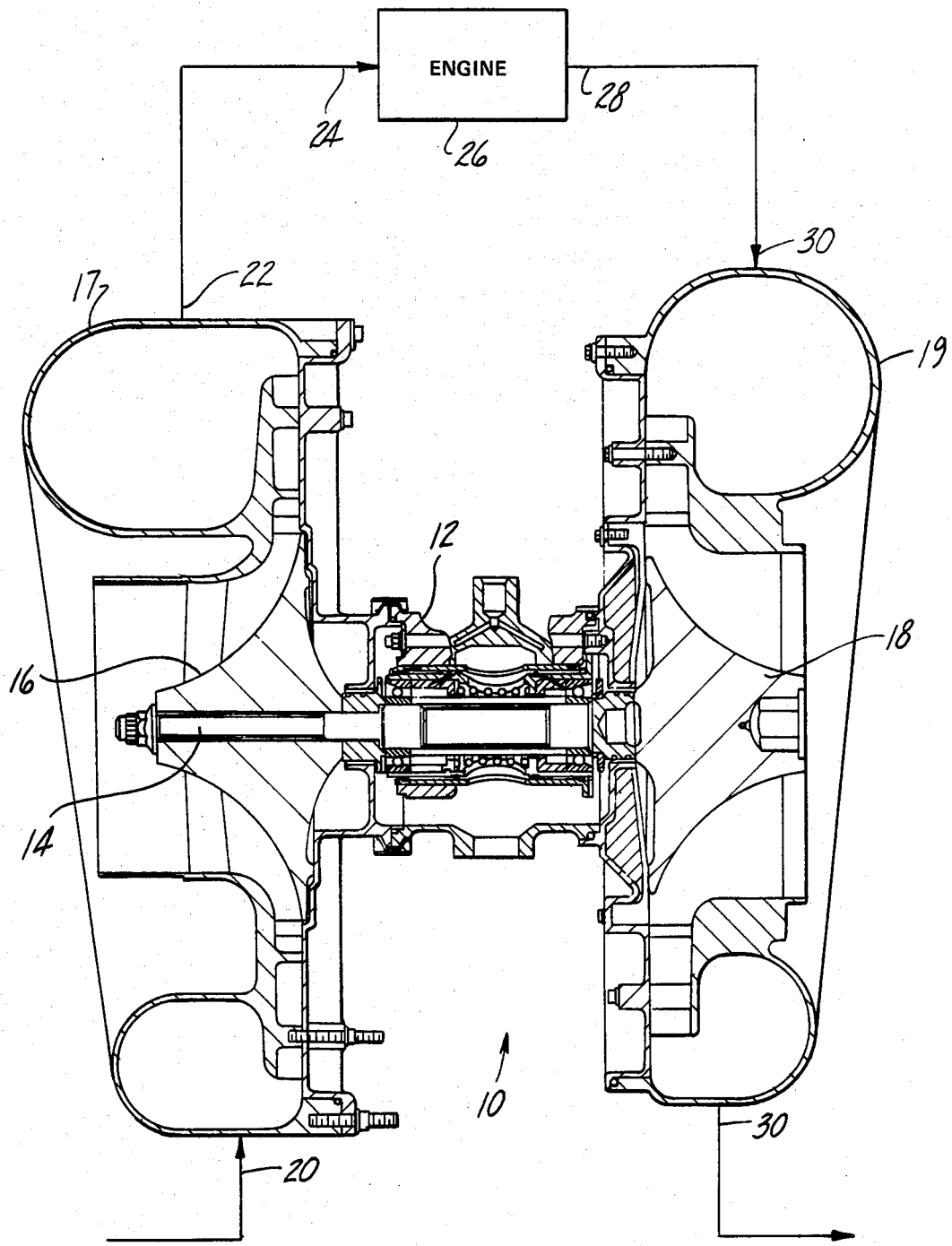
FIG. 1 is a diagrammatic view illustrating a preferred embodiment of the present invention.

With reference first to FIG. 1 a preferred embodiment of the turbocharger 10 of the present invention is thereshown and comprises a main housing 12 having a shaft 14 rotatably mounted to it in a fashion which will be subsequently described in greater detail. A compressor 16 is secured to one end of the shaft while a turbine 18 is secured to the other end of the shaft 14. The compressor 16 is contained within a compressor casing 17 while, similarly, the turbine 18 is contained within a turbine casing 19.

Upon rotation of the compressor 16, the compressor 16 inducts air from its inlet 20 (illustrated diagrammatically) and supplies the compressed air at its outlet 22 to the intake 24 of an internal combustion engine 26. The internal combustion engine 26 has its exhaust 28 secured to the inlet 30 of the turbine 18 and the exhaust 32 from the turbine 18 is open to the atmosphere. In the conventional fashion, the exhaust from the engine 26 rotatably drives the turbine which in turn rotatably drives the compressor 16 through the shaft 14 to supply compressed air to the engine 26.

Figure 2:
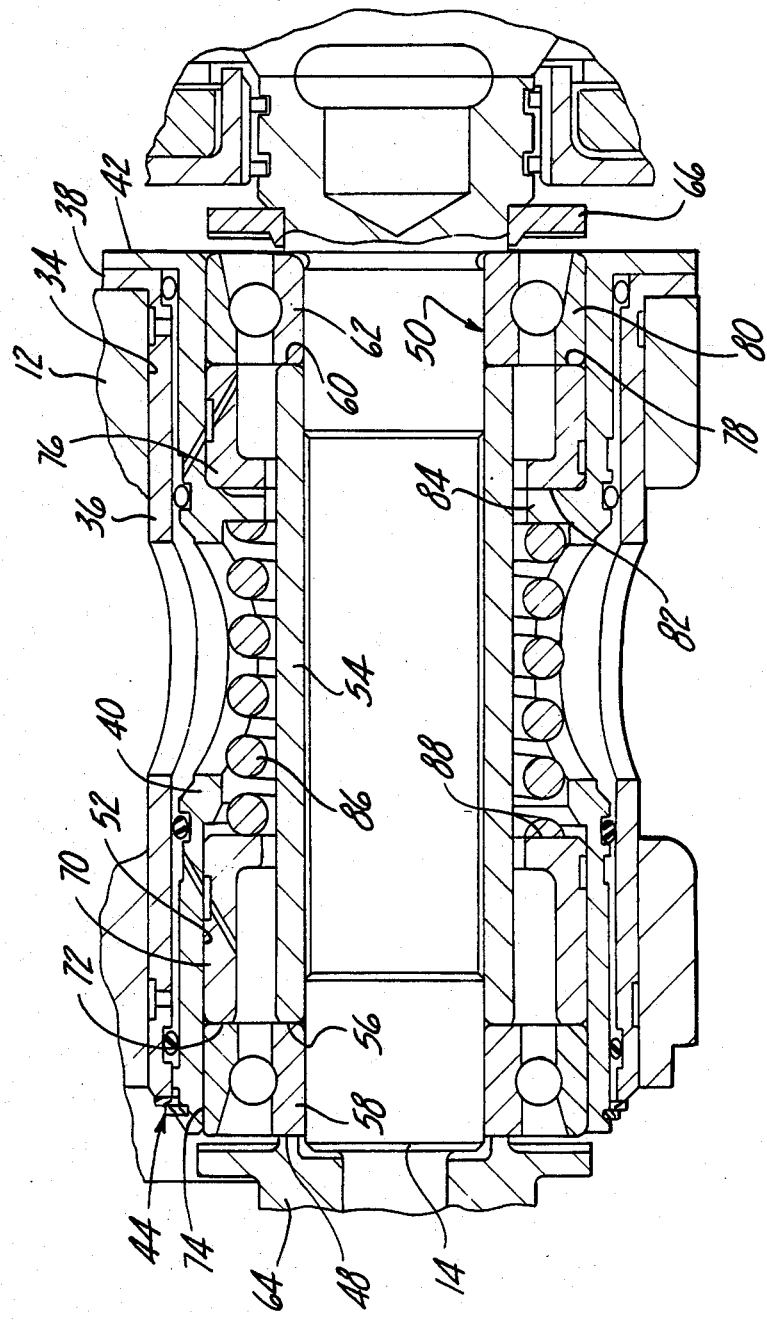
FIG. 2 is a fragmentary longitudinal sectional view illustrating the preferred embodiment of the present invention.

With reference now particularly to FIG. 2, the housing 12 includes a throughbore 34 which is coaxial with the shaft 14. A tubular bearing housing 36 having an outwardly flanged end 38 is press fit into the throughbore 34 until the flanged end 38 of the bearing housing 36 abuts against the main housing 12. Preferably the housing 12 is constructed of aluminum for lightweight construction while the bearing housing 12 is constructed of steel for durability.

A tubular cylindrical bearing carrier 40 having an outwardly extending flange 42 at one end is then positioned within the bearing housing 36 so that the flanges 38 and 42 flatly abut against each other. A retaining ring assembly 44 secures the bearing housing 36 and bearing carrier 40 to each other, and thus to the housing 12, against axial movement.

A first and second axially spaced bearing assembly 48 and 50 rotatably mount the turbocharger shaft 14 to the bearing carrier 40. Each bearing assembly 48 and 50 preferably comprises a ball bearing assembly having its inner race 58 and 62, respectively, secured for rotation with the shaft 14 and its outer race 74 and 80, respectively, secured against radial movement to the inner periphery 52 of the bearing carrier 40. For a reason to be shortly described, however, some axial movement of the outer races of the bearing assemblies 48 and 50 is permitted. In addition, the bearing assemblies 48 and 50 are mounted between the shaft 14 and the bearing carrier 40 adjacent each end of the bearing carrier 40.

Still referring to FIG. 2, a tubular and cylindrical spacer 54 is positioned coaxially around the shaft 14 between the bearing assemblies 48 and 50. The spacer 54 is dimensioned so that one end 56 abuts against an inner axial end of the inner race 58 of the first bearing assembly 48. Similarly, the other end 60 of the spacer 54 abuts against the inner axial end of the inner race 62 of the second bearing assembly 50. A first slinger 64 is then second to the shaft 14 so that it abuts against the outer axial end of the first bearing assembly inner race 58 and, similarly, a second slinger 66 is secured to the shaft 14 so that it abuts against the outer axial end of the second bearing assembly inner race 62. Consequently, the slingers 64 and 66, together with the spacer 54, secure the inner races 58 and 62 of the bearing assemblies 48 and 50, respectively, against axial movement with respect to the shaft 14.

Still referring to FIG. 2, a first annular spacer nozzle 70 is contained within the interior of the bearing carrier 40 and has one axial end 72 which abuts against the inner axial end of the first bearing assembly outer race 74. Similarly, a second annular spacer nozzle 76 is contained within the interior of the bearing carrier 40 and has its outer axial end 78 in abutment with the inner axial end of the second bearing assembly outer race 80. An inner axial end 82 of the spacer nozzle 76 abuts against a radially inwardly extending portion or flange 84 on the bearing carrier 40.

A helical compression spring 86 is sandwiched in between the inner axial end 88 of the spacer nozzle 70 and the inner axial end of the bearing carrier flange 84. The compression spring 86 is in a state of compression, for example at 50 pounds pressure.

In operation, the compression spring 86 exerts an outward axial force on the spacer nozzle 70 which in turn exerts an outward axial force on the first bearing assembly outer race 74. This outward axial force is transmitted through the shaft 14 to the other bearing assembly 50 so that an outward axial force is exerted on the second outer race outer race 80. This outward force is in turn transmitted through the spacer nozzle 76 and bearing carrier flange 84 to the opposite end of the helical spring 86. Consequently, the outward axial force exerted on the outer races 74 and 80 of the ball bearing assemblies 48 and 50, respectively, are equal but opposite in direction.

From the foregoing, it can be seen that a primary advantage of the present invention is that the bearing assemblies 48 and 50 are preloaded by the spring 86 in equal but opposite directions thus eliminating any mechanical play which may be present in the bearing assemblies 48 and 50. Furthermore, since the outward forces exerted on the outer races of the bearing assembly are equal to, but opposite of, each other, any wear of the bearing assemblies is equally distributed between the bearing assemblies 48 and 50.

A still further advantage of the present invention is that the spacer nozzles, together with the helical spring, are wholly contained in between the bearing assemblies 48 and 50. This results not only in an inexpensive but also compact construction for the turbocharger.

Having described my invention, however, many modifications thereto will become apparent to those skilled in the art to which it pertains without deviation from the spirit of the invention as defined by the scope of the appended claims.

I claim:

1. A turbocharger comprising:
   a main housing having a throughbore,
   a tubular bearing carrier coaxially positioned within said throughbore,
   means for securing said bearing carrier to said housing against axial movement,
   a shaft extending through said bearing carrier, said shaft having a turbine at one end and a compressor at its other end,
   a pair of bearing assemblies for rotatably mounting said shaft to said bearing carrier, each bearing assembly comprising an inner race, an outer race, and bearing elements entrapped between said races, said bearing assemblies being axially spaced from each other and contained between said turbine and said compressor,
   means for securing said inner races against axial movement to said shaft,
   means contained between said bearing assemblies for urging the outer races of said bearing assemblies axially away from each other,
   wherein said bearing carrier includes a radially inwardly extending flange and wherein said urging means comprises:
   a first annular spacer positioned around said shaft and having an outer end in abutment with an inner axial end of the outer race of one bearing assembly,
   a second annular spacer positioned around said shaft and having an outer end in abutment with an inner axial end of the outer race of the other bearing assembly, said second spacer having an inner axial end in abutment with one axial end of said flange, and
   means for resiliently urging said first annular spacer and the other axial end of said flange away from each other whereby said resilient urging means automatically positions each said bearing assembly at a predetermined axial position with respect to said flange.

2. The invention as defined in claim 1 wherein said resilient urging means comprises a compression spring in a state of compression.

3. The invention as defined in claim 1 and comprising a spacer tube positioned around said shaft so that opposite ends of said tube abut against the inner axial ends of said inner races, and
means secured to said shaft which abut against the outer axial ends of said inner races.

4. The invention as defined in claim 3 wherein said last mentioned means comprises a pair of annular slingers, said slingers being secured to said shaft so that each slinger abuts against an outer axial end of each inner race.

* * * * *